US007082454B1

(12) United States Patent
Gheith

(10) Patent No.: US 7,082,454 B1
(45) Date of Patent: Jul. 25, 2006

(54) DYNAMIC CONTENT CACHING FRAMEWORK

(75) Inventor: Ahmed M. Gheith, Round Rock, TX (US)

(73) Assignee: Trilogy Development Group, Inc., Austin, TX (US)

( * ) Notice: Subject to any disclaimer, the term of this patent is extended or adjusted under 35 U.S.C. 154(b) by 0 days.

(21) Appl. No.: 09/440,246

(22) Filed: Nov. 15, 1999

(51) Int. Cl.
G06F 15/16 (2006.01)

(52) U.S. Cl. ............... 709/203; 709/216; 709/219; 707/10; 705/26

(58) Field of Classification Search ............ 709/203, 709/201, 212, 216, 217, 219, 250; 707/513, 707/514, 10; 705/26
See application file for complete search history.

(56) References Cited

U.S. PATENT DOCUMENTS

| | | | | |
|---|---|---|---|---|
| 5,452,447 A * | 9/1995 | Nelson et al. | ............... | 707/205 |
| 5,742,807 A | 4/1998 | Masinter | | |
| 5,754,844 A | 5/1998 | Fuller | | |
| 5,802,292 A * | 9/1998 | Mogul | .................. | 709/203 |
| 5,878,223 A * | 3/1999 | Becker et al. | ............ | 709/223 |
| 5,974,455 A * | 10/1999 | Monier | .................. | 709/217 |
| 6,006,264 A * | 12/1999 | Colby et al. | ............ | 709/220 |
| 6,038,601 A * | 3/2000 | Lambert et al. | .......... | 709/226 |
| 6,182,122 B1 * | 1/2001 | Berstis | .................. | 709/203 |
| 6,185,608 B1 * | 2/2001 | Hon et al. | ................ | 709/216 |
| 6,289,358 B1 * | 9/2001 | Mattis et al. | .............. | 707/10 |
| 6,324,565 B1 * | 11/2001 | Holt, III | .................. | 709/203 |
| 6,347,398 B1 * | 2/2002 | Parthasarathy et al. | ..... | 707/203 |
| 6,351,767 B1 * | 2/2002 | Batchelder et al. | ........ | 709/219 |
| 6,366,947 B1 * | 4/2002 | Kavner | .................. | 709/203 |
| 6,385,641 B1 * | 5/2002 | Jiang et al. | ............... | 709/203 |
| 6,389,510 B1 * | 5/2002 | Chen et al. | ............... | 709/213 |
| 6,405,192 B1 * | 6/2002 | Brown et al. | .............. | 707/3 |
| 6,427,172 B1 * | 7/2002 | Thacker et al. | ............ | 709/235 |
| 6,553,393 B1 * | 4/2003 | Eilbott et al. | ............. | 715/513 |
| 6,553,461 B1 * | 4/2003 | Gupta et al. | .............. | 711/137 |
| 6,615,235 B1 * | 9/2003 | Copeland et al. | .......... | 709/203 |

OTHER PUBLICATIONS

Bruce Schneier, "One-Way Hash Functions", Applied Cryptography Second Edition, Chapter 18, pp. 429-459, © 1996.

* cited by examiner

*Primary Examiner*—Ario Etienne
*Assistant Examiner*—Gregory G. Todd

(57) ABSTRACT

A dynamic content caching framework that encodes dynamically created documents with a filename that is derived from the state information describing the contents of the document, advantageously allows for the dynamically created documents to be cached and reused, thereby reducing server computation, and allowing more users to utilize a particular web site. A file cache management system manages files that can be provided by a web server computer system to a client computer system. Parameters selected by a user viewing a web page define a presentation state that describes, and is used to produce, a subsequent web page. The presentation state is processed using a one-way hashing function to form a hash value, or signature, for that presentation state which is then used to identify the file in which presentation information for the presentation state is stored. When another user chooses the same presentation state, the existing file having presentation information can be identified quickly and reused.

40 Claims, 3 Drawing Sheets

DYNAMIC CONTENT CACHING FRAMEWORK

BACKGROUND OF THE INVENTION

1. Field of the Invention

This invention relates to the client/server computing environment, and particularly to caching of content provided to users in a client/server computing environment.

2. Description of the Related Art

As more users begin to take advantage of businesses which use the Internet and the World Wide Web (the "web") to describe, market, sell, and deliver products and services, the performance of business web sites becomes an issue of greater importance.

Web documents, or web pages, are stored on numerous server computer systems ("servers") that are connected to the Internet. Each document on the web has a distinct universal resource locator (URL) which indicates where the document is located (e.g., the Internet domain name of the site on which the server is running, and the location on the server including file or directory specification) and how to access it (e.g., the protocol used when accessing the server containing the document). URLs can also include query strings so as to pass additional information to the Internet resource.

Many of the documents stored on web servers are written in one of several standard document description or markup languages such as Hypertext Markup Language (HTML) or Extensible Markup Language (XML). Using a markup language, a designer of web documents can associate hypertext links or annotations with specific words or phrases in a document and specify visual aspects and the content of a web page. The hypertext links identify the URLs of other web documents or other parts of the same document providing information related to the words or phrases. Information within web documents and available for delivery in response to a user's request is generally referred to as "content" and can take a variety of forms including text, graphics, audio, video, and others.

A user accesses documents stored on the web using a web browser (a computer program designed to display markup language documents and communicate with web servers) running on a client computer system connected to the Internet. Typically, this is done by the user selecting a hypertext link (typically displayed by the web browser as a highlighted word or phrase) within a document being viewed with the web browser. The web browser then issues a hypertext transfer protocol (HTTP) request for the requested document to the web server identified by the requested document's URL. In response, the designated web server returns the requested document to the web browser, also using the HTTP.

When the content of web pages is relatively static, i.e., it does not change frequently, or require frequent updates, web site performance depends primarily upon the web site's ability to serve requested documents to users. Serving documents requires relatively little in the way of server computer system processing resources, and can be scaled to accommodate increasing numbers of users with relative ease. One technique to make delivery of static documents more efficient is to implement a web cache. A web cache can improve the response time to a particular user's request by storing a copy of the requested document on at least one alternate web site, one that is preferably closer to, or more accessible by, the user. Again, such systems work well when the documents are relatively static.

However, as web site content becomes more sophisticated, it becomes more difficult to maintain high levels of performance. For example, if a user is configuring a product to be purchased from a business's web site, it is often desirable for the content of the web pages to be dynamic. If, on an opening web page, the user selects several product options, a subsequent web page can be very different, depending upon the options selected. To accommodate this kind of flexibility, many web pages (e.g., the aforementioned subsequent web page) are only created by applications running on or in conjunction with the web server computer system after a user has made a specific request. Such dynamic content production can be very computation intensive, and thus it can have a significant effect on server performance. Moreover, traditional web page caching systems are ineffective when the web page content is dynamic.

Accordingly, it is desirable to have a dynamic web content caching framework that allows for the caching and reuse of dynamically created documents in an efficient manner, thereby reducing the amount of computation required by web and/or application servers.

SUMMARY OF THE INVENTION

It has been discovered that dynamic content caching framework that encodes dynamically created documents with a filename that is derived from the state information describing the contents of the document, advantageously allows for the dynamically created documents to be cached and reused, thereby reducing server computation, and allowing more users to utilize a particular web site. A file cache management system manages files that can be provided by a web server computer system to a client computer system. Parameters selected by a user viewing a web page define a presentation state that describes, and is used to produce, a subsequent web page. The presentation state is processed using a one-way hashing function to form a hash value, or signature, for that presentation state which is then used to identify the file in which presentation information for the presentation state is stored. When another user chooses the same presentation state, the existing file having presentation information can be identified quickly and reused.

In one embodiment of the invention, a dynamic content caching and retrieval system that facilitates reusability of dynamically generated electronic files includes a processor and a computer readable medium coupled to the processor. The system further includes dynamically generated electronic files stored in a storage medium, each dynamically generated electronic file includes an identifier that is derived from dynamically generated presentation information stored in the file. The system also includes a computer readable representation received by the system from a client computing system, the computer readable representation having a presentation state signature based on a presentation state defined, at least in part, by one or more parameters selected by a user interacting with a file displayed by the client computing system that are useful to identify one of the dynamically generated electronic files in which stored presentation information is associated with the presentation state upon which the signature is based. The computer readable medium includes a routine executable by the processor to determine if the presentation state signature of the computer readable representation identifies one of the dynamically generated electronic files stored in the memory of the system, retrieving the described dynamically generated electronic file and serving the retrieved file to the client computer system.

In another embodiment of the present invention, a method of caching and retrieving cached dynamically generated files that each include presentation information characterized by respective presentation states, the file operable to be provided by an application running on a server computer system to at least one client computer system includes receiving a file request that includes information based on selections of a user interacting with a web page using at least one client computer system. The method further includes determining whether the file request identifies one of the cached dynamically generated files and retrieving the dynamically generated file identified by the file request and transmitting the file to the at least one client computer system if the file exists in a cache. The method also includes computing presentation information based on the information in the file request when a dynamically generated file does not exist in the cache and saving the computed presentation information in a file in the cache, thus creating a dynamically generated file, and transmitting the dynamically generated file to the at least one client computer system.

Another aspect of the present invention provides a file encoded in a computer readable medium as instructions executable on a processor, wherein the computer readable medium is one of a magnetic storage medium, an optical storage medium, and a communications medium conveying signals encoding the instructions. The file includes presentation information characterized by a presentation state, and a filename computed from the presentation state.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
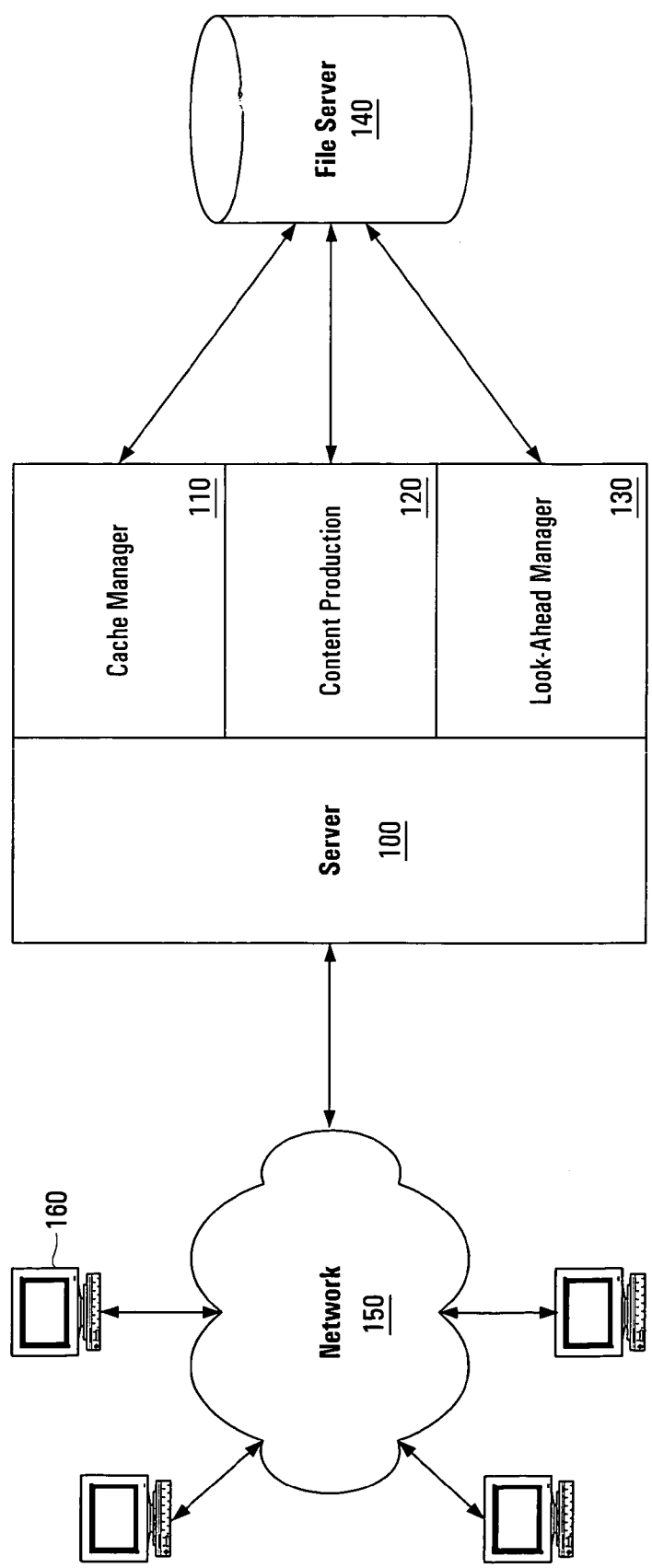
FIG. 1 illustrates a client/server computing environment utilizing a file cache management system.

FIG. 1 illustrates a client/server computing environment for providing dynamically cached content to users via, for example, an interactive web site, and utilizing a file cache management system. Server 100 is typically a web server including the necessary hardware and software to serve HTML or XML documents, associated files, applications, and scripts to one or more client computers systems 160 when requested by a user of, or an autonomous program executing on, a client computer system. Client computer systems 160 typically utilize HTML or XML browsers to display the documents, and to generally interact with server 100. As illustrated, server 100 and clients 160 are coupled to each other through a communications network 150, such as the Internet. Server 100 and clients 160 can alternately be coupled to each other through point-to-point connections, or dedicated connections. Server 100 is typically an Intel Pentium-based or RISC based computer system equipped with one or more processors, memory, input/output interfaces, a network interface, secondary storage devices, and a user interface.

Server 100 includes three applications in addition to web serving functionality: cache manager 110, content production 120, and look-ahead manager 130. Each of server 100, cache manager 110, content production 120, and look-ahead manager 130, are coupled to and communicate with file server 140, which typically holds a plurality of files including presentation information files (e.g., HTML and/or XML documents) that are to be made available to users of client computer systems 160. Although cache manager 110, content production 120, and look-ahead manager 130 are illustrated as part of (e.g., applications executing on) server 100, each of the applications can reside on a separate application server, or various ones of the applications can be implemented on a single server. Moreover, although file server 140 is illustrated as a separate entity, it too can also be combined with one or more of server 100, cache manager 110, content production 120, and look-ahead manager 130.

Figure 2:
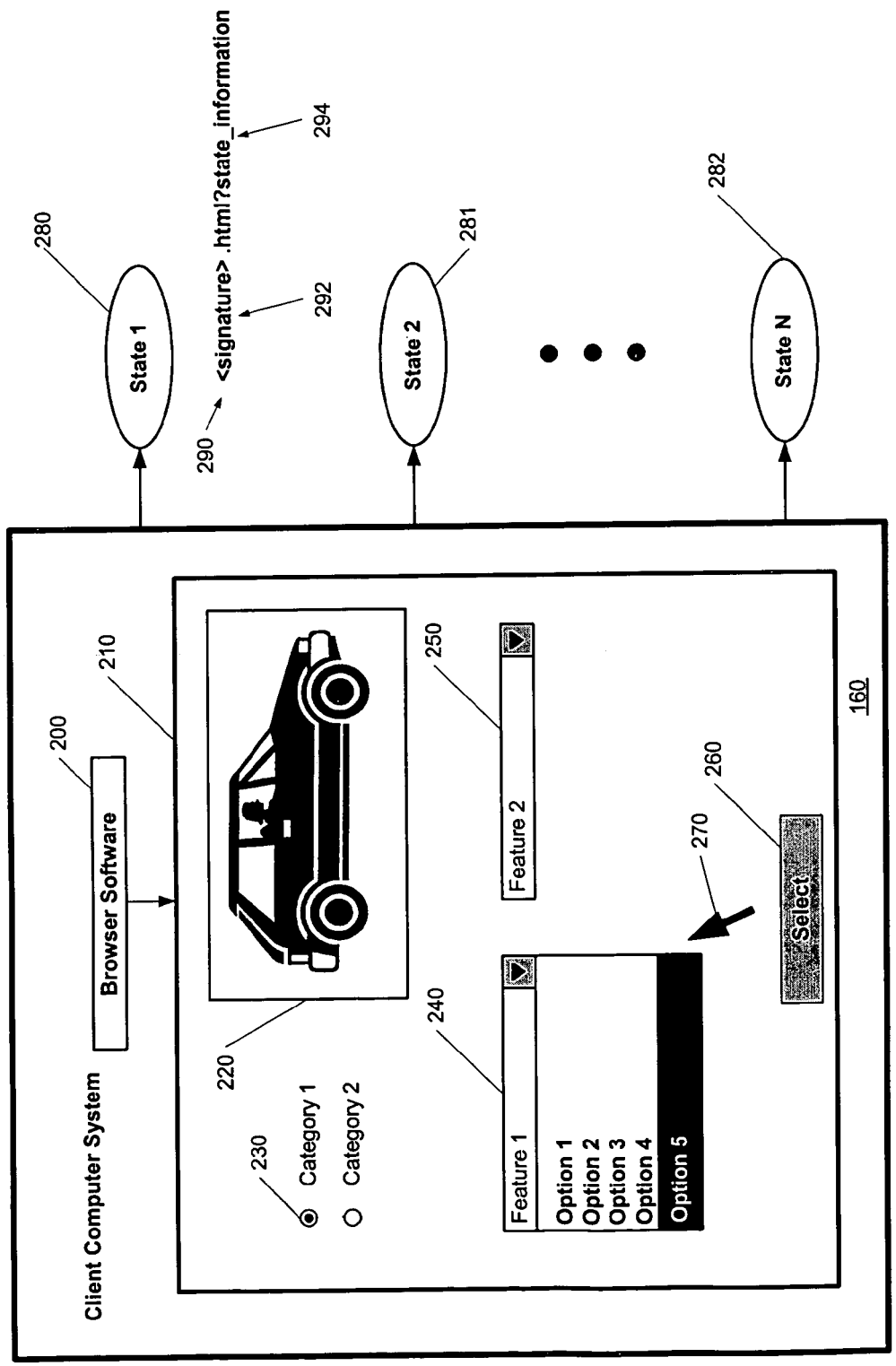
FIG. 2 illustrates a web page displayed by browser software on a client computer system, and the various states associated with user selection combinations.

FIG. 2 illustrates presentation information, or web page 210 displayed by browser software 200 executing on client computer system 160. Web page 210 is illustrative of a web page where a user can make a number of product-related configuration choices. Image 220 illustrates the product being configured, and can change depending on previous choices made by the user, as well as choices made by the user when interacting with web page 210. Updating image 220 while the user selects various parameters on web page 210 can be accomplished via a script embedded in the web page, an applet downloaded with the web page, or via the markup language used to describe the page (e.g., XML). Radio buttons 230 allow the user to select between category 1 and category 2, which can vary depending on the type of product being configured. Additionally various product options can be selected for a variety of product features. Pop-up menu 240 lists five user-selectable options 245 (option 5 being highlighted as if it has been selected) for a particular feature. Similarly, other selections can be made via pop-up menu 250, clicking on images, or other graphical user interface (GUI) elements (e.g., check boxes, slides, buttons, text entry boxes, etc., not shown), as is well known to those having ordinary skill in the art. Pointer 270 is a common GUI element used (under control of a pointing devices such as a mouse) to make selections. When the user is finished configuring the product as desired, he or she can cause the selections to be transmitted back to the server by actuating button 260.

Given the configuration options made available to the user via web page 210, two category options 230, five feature 1 options 245, and two feature 2 options (not shown), there are a total of 20 possible combinations of options. These different combinations will be used to configure the product, and thus are needed to determine the content of a subsequent web page (e.g., an image of an automobile having the selected options, or a new series of configuration options that depend on the selections made in web page 210). Each of those possible combinations is described by a state or presentation state, such as state 1 280, state 2 281, and state N 282. Each state, in turn, is described by a computer readable representation, such as partial URL 290. Partial URL 290 includes a filename 292 having a signature that is based on the presentation state, and thus the presentation information stored, in the file and representing the next document to be served when the user's selections in web page 210 resolve to that particular state. Partial URL 290 also includes an external representation of the state information 294. State information is typically encoded in a byte stream (understandable by, for example, cache manager 110, content production 120, and/or look-ahead manager 130) and implemented as a URL query string. In this way, web page 210, includes URLs (or partial URLs) for each next state. As will be seen below, these URLs are embedded in the presentation information that constitutes web page 210.

As illustrated in FIG. 2, the state information for each subsequent state from the state that defines web page 210 can include information about various selections made by the user (e.g., category 1, Feature 1/Option 5, etc.). The state or presentation state information can also include additional information not directly related to the selections made by the user, or indeed not directly related to the presentation itself. For example, if web page 210 and the associated subsequent states were created based on one version of product configuration options, that version number can be included in the state information. In another embodiment, version information for all of the software and data used to produce a web page (e.g., content production 120, any markup language or style sheets, and a feature set) is encoded in the state information. Such version information allows server 100, or associated applications to update or delete documents based on version information. If a user has an old URL that points to a web page that was created using an outdated version of the software and data, the user can be redirected to make a new configuration, and/or useful configuration information can be extracted from the old version and reused to create a new version of the web page. Those having ordinary skill in the art will readily recognize that a variety of different types of information and data can be included in a state or presentation state for the purposes of document encoding and dynamic content cache management.

Figure 3:
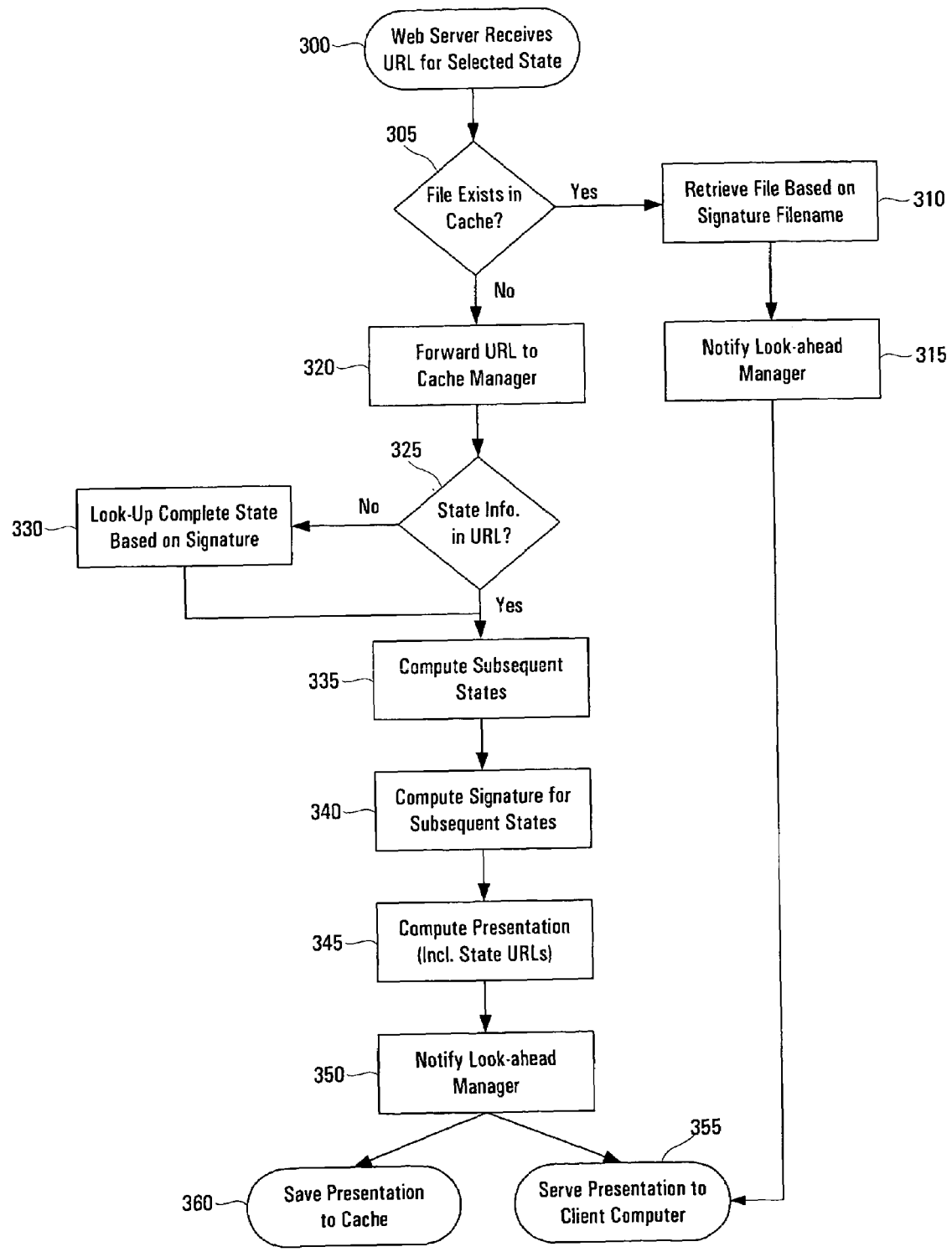
FIG. 3 is a flow chart describing a dynamic content caching framework.

FIG. 3 is a flow chart describing the dynamic content caching framework. The process begins at 300 where a web server (such as server 100) receives a URL or partial URL for a selected subsequent state 290. The server 100, cache manager 110, file server 140, or some other process determines if the file described by the URL exists in the cache, as shown in 305. The determination in 305 is preferably made by a combination of server 100 and another program. For example, when a user makes a file request by submitting a URL to a web server, an HTTP error 404 (file not found, i.e., a page fault) is typically returned to the user when the file cannot be found. Determination 305 can take advantage of this error reporting mechanism by hiding the error from the user, and using the occurrence of the error to cause the URL to be forwarded to the cache manager 110. This is an easy and efficient mechanism to determine when a cache miss has occurred.

If the file does exist in the cache, it is retrieved at 310, based on the signature file name (e.g., filename 292). In an optional step 315, look-ahead manager 130 is provided with information about the state that was requested, and/or information about the states subsequent to the state that was requested. As was shown in conjunction with FIG. 2, state information for subsequent states is encoded in the file describing the state being displayed (e.g., web page 210) and in states requested and retrieved.

Look-ahead manager 130 can use this information to determine if in fact files including the presentation information for the subsequent states exist, and if not, it can initiate the content production for those subsequent states (which will then be stored in the filenames already specified) because that content is based on subsequent state information which is encoded in the URLs embedded in the retrieved file (e.g., partial URL 290, and state information 294). This can enhance performance of the overall system because look-ahead manager 130 populates the cache with some or all of the files necessary to display the next state selected by a user. Look-ahead manager 130 can continue this process further, by searching for and causing the computation of files based on the states subsequent to the subsequent states. The "depth" which look-ahead manager searches can be adjusted for optimal performance. This feature can also be used to initially populate a cache given the first possible state, and a specification of how deep the look-ahead should be performed. Moreover, sophisticated look-ahead algorithms can be employed (e.g., those used in chess programs, or those used for file access). In one example, look-ahead manager 130 can prune subsequent states, i.e., suspend computation of presentations based on those states, when a user's subsequent state selection indicates the next path to be taken. In general, look-ahead manager can optionally be used to enhance the performance of the dynamic content caching framework.

Once the requested file including presentation information is retrieved, as in 310, the file is served to the requesting client computer, 355.

When it is determined that the file described by the URL does not exist in the cache, operation proceeds to 320 where some or all of the information contained in the URL is forwarded to cache manager 110. As before, the functions illustrated in 320 can be performed by the server 100 (e.g., an active server page (ASP) running on the web server, a Java server page (JSP) running on the server, a script, or an servlet), cache manager 110, file server 140, or some other process. In 325, cache manager 110 determines if the state information 294 is included in the URL. In some situations, the amount of state information will be too voluminous to include as a query string in URL 290. In those situations, a look-up table maintained by cache manager 110 and indexed by, for example, state signature 292, will be consulted (330) to provide the necessary state information. The look-up table can also be used by look-ahead manager 130 to provided needed state information. In many situations, however, the state information will be encoded in the URL as illustrated in FIG. 2, and the cache manager can extract that state information. Subsequent states are computed in 335 based on the extracted state information. This computation can be performed by cache manager 110, or some other application. Next, signatures for each of the subsequent states are computed in 340.

The state signatures, which are used for the filenames associated with presentation information representing the subsequent states, are typically computed using a hash function, and preferably a one-way hash function. Hash functions are used to convert an identifier, key, or other meaningful information (in this example the state information) into a value for the location of corresponding data (such as the computed HTML presentation corresponding to the state information). One-way hash functions, like regular hash functions, operate on an arbitrary-length piece of information (a "message") to return a fixed-length hash value. Unlike ordinary hash functions, one-way hash functions produce hash values that are essentially unique, that is there is only a very low probability that two different messages will have the same hash value. Consequently, one-way hash functions are useful in producing the essentially-unique signatures that can be used as filenames to identify web pages in the cache. A variety of different one-way hash functions have been developed, each with varying degrees of computational complexity and security (i.e., hash value uniqueness and reverse computability). Some one-way hash functions include Snefru, N-Hash, MD5, Secure Hash Algorithm (SHA), RIPE-MD, and HAVAL. These, and other one-way hash functions are described in detail in *Applied Cryptography: Protocols, Algorithms and Source Code in C Management*, by Bruce Schneier, pp. 429–459, Wiley (1996), which is incorporated by reference herein, in its entirety.

Based on the state information extracted from the URL in 325, or obtained by look-up in 330, the presentation is computed in 345. This process is typically performed by content production 120, and may include one or more interim steps, such as generating XML code and then using a style sheet (e.g., based on the Extensible Stylesheet Language (XSL)) to produce HTML. Note that the XML and XSL code used to generate the presentation from a particular state can be specialized for that state, or for a class of states to which the state belongs. During this process, URLs (including computed signatures and/or state information) representing the subsequent states are embedded in the presentation information. In step 350, look-ahead manager 130 is optionally notified, and operates as described above. Finally, the requested file including presentation information is served to the requesting client computer in 355, and the file including presentation information is saved to the cache in 360.

A variety of system refinements can be included to enhance operation of the overall client/server computing environment. For example, if two separate users were making selections that yielded the same state, and the cache did not include a document for that state, two separate, and simultaneous attempts would be made to have the content generated, but both would require the same essentially-unique signature. In this instance, file server 140 could handle the filename contention by temporarily allowing the creation of two separate file, and then reconciling those files with the cache. Additionally, cache manager 110 can be part of a larger application, for example an server based application designed to provided configurable products as part of the entire selling chain. File server 140 can include the cache itself, and be a shared resource among many different web servers, thereby allowing the various cached states to be more efficiently utilized, particularly in an architecture were multiple web servers share a small number of (or one) file servers/page fault servers. Similarly, a dedicated look-ahead manager server can be implemented in conjunction with the file servers for more efficient operation.

In yet another example, it will be recognized that some web pages, e.g., the first web page accessed as part of the process, might not include complete (or any) state information for subsequent states. In this case, the page should include some initial state information, so that the process outlines in FIG. 3 can operate properly.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of caching and retrieving cached dynamically generated files that each include presentation information characterized by respective presentation states, wherein each dynamically generated file is associated with a file identifier that is derived from state information that describes contents of the associated dynamically generated electronic file and the file is operable to be provided by an application running on a server computer system to at least one client computer system, the method comprising:
   receiving a file request that includes state information based on selections of a user interacting with a web page using at least one client computer system;
   determining whether the file request identifies one of the cached dynamically generated files;
   retrieving the dynamically generated file identified by the file request and transmitting the file to the at least one client computer system if the file exists in the cache;
   computing presentation information based on the state information in the file request when a dynamically generated file does not exist in the cache; and
   saving the computed presentation information in a file in the cache, thus creating a dynamically generated file, and transmitting the dynamically generated file to the at least one client computer system.

2. The method of claim 1 wherein the file request includes at least one of a filename based on the first state, and first state information.

3. The method of claim 1 wherein the file request includes a filename computed from the information based on selections by a user interacting with a web page using a hash function.

4. The method of claim 1 wherein the file request is a URL.

5. The method of claim 1 wherein the determining whether the file request identifies one of the cached dynamically generated files further comprises monitoring for a file not found error, and computing the presentation information when a file not found error occurs.

6. The method of claim 5 wherein the file not found error is an HTTP error 404.

7. The method of claim 1 wherein the computing presentation information further comprises:
   computing at least one subsequent state based on the selections by a user interacting with a web page;
   computing a signature of the at least one subsequent state based on at least one subsequent state; and
   including the signature of the at least one subsequent state and the at least one subsequent state in the presentation information.

8. The method of claim 1 encoded in a computer readable medium as instructions executable on a processor, the computer readable medium being one of a magnetic storage medium, an optical storage medium, and a communications medium conveying signals encoding the instructions.

9. Dynamically generated files created in accordance with the method of claim 1.

10. The dynamically generated files of claim 9 wherein at least a portion of the presentation information of each dynamically generated file is encoded in a markup language.

11. The file of claim 10 wherein the markup language is one of Hypertext Markup Language (HTML) and Extensible Markup Language (XML).

12. The dynamically generated files of claim 9 wherein the web page is a product configuration web page and the file request is a Universal Resource Locator (URL) that includes state information comprising information based on user configuration selections.

13. The method of claim 1 wherein the selections of the user interacting with the web page include configuration options selections for one or more configurable products for display in accordance with the associated dynamically generated electronic file.

14. A dynamic content caching and retrieval system that facilitates reusability of dynamically generated electronic files, the system comprising:
   a processor;
   a computer readable medium coupled to the processor;
   dynamically generated electronic files stored in a storage medium, each dynamically generated electronic file includes an identifier that identifies dynamically generated presentation information stored in the file; and a computer readable representation received by the system from a client computer system, the computer readable representation having a presentation state signature based on a presentation state defined, at least in part, by one or more parameters selected by a user interacting with a file displayed by the client computer system, wherein the computer readable representation is useful to identify one of the dynamically generated electronic files in which stored presentation information is associated with the presentation state upon which the signature is based;

wherein the computer readable medium includes a routine executable by the processor to determine if the presentation state signature of the computer readable representation identifies one of the dynamically generated electronic files stored in the storage medium of the system, to retrieve any identified dynamically generated electronic file and to serve the retrieved file to the client computer system.

15. The dynamic content caching and retrieval system of claim 14 further comprising:

a subsequent presentation state computation routine operable to cause at least one subsequent presentation state to be computed based on the presentation state signature; and a presentation state signature computation routine operable to determine a presentation state signature for one or more subsequent presentation states.

16. The dynamic content caching and retrieval system of claim 15 further comprising a presentation information computation routine operable to compute subsequent presentation information based upon the at least one subsequent presentation state.

17. The dynamic content caching and retrieval system of claim 15 wherein the computer readable representation is a universal resource locator that includes a filename and state information for one of the dynamically generated electronic files.

18. The dynamic content caching and retrieval system of claim 15 further comprising a file cache and a look-ahead manager, the look-ahead manager operable to perform at least one of:

determining if the file cache includes a dynamically generated electronic file having presentation information characterized by the presentation state signature for one or more subsequent presentation states; and causing a presentation information computation routine to compute subsequent presentation information based upon one or more subsequent presentation states.

19. The dynamic content caching and retrieval system of claim 18 wherein the determining if the file cache includes a dynamically generated electronic file includes searching the file cache for a file having a filename including the presentation state signature from the computer readable representation.

20. The dynamic content caching and retrieval system of claim 14 wherein the subsequent presentation state computation routine and the presentation state signature computation routine are encoded in the computer readable medium as instructions executable on the processor, and the computer readable medium being one of a magnetic storage medium, an optical storage medium, and a communications medium conveying signals encoding the instructions.

21. The dynamic content caching and retrieval system of claim 14 wherein at least a portion of the presentation information is encoded in a markup language.

22. The dynamic content caching and retrieval system of claim 21 wherein the markup language is one of Hypertext Markup Language (HTML) and Extensible Markup Language (XML).

23. The method of claim 21 wherein the hash function is a one-way hash function.

24. The dynamic content caching and retrieval system of claim 14 further comprising:

a plurality of additional computer readable representations from one or more client computer systems, each of the computer readable representations having a presentation state signature based on a presentation state defined, at least in part, by one or more parameters selected by a user interacting with a file displayed by one of the client computer systems that are useful to identify one of the dynamically generated electronic files in which stored presentation information is associated with the presentation state upon which the signature is based;

wherein the routine is further executable by the processor to determine if the presentation state signatures of the computer readable representations identify one of the dynamically generated electronic files stored in the memory of the system, retrieving the described dynamically generated electronic files, and serving the retrieved files to the client computer system from which the computer readable representation was received.

25. The dynamic content caching and retrieval system of claim 24 further comprising:

a subsequent presentation state computation routine operable to cause at least one subsequent presentation state to be computed based on each presentation state signature; and a presentation state signature computation routine operable to determine a presentation state signature for each subsequent presentation state.

26. The dynamic content caching and retrieval system of claim 24 wherein each computer readable representation is a Universal Resource Locator (URL) comprising the presentation state signature based on the presentation state.

27. The dynamic content caching and retrieval system of claim 14 further comprising a file cache operable to store the dynamically generated electronic files.

28. The dynamic content caching and retrieval system of claim 27 wherein the file cache is a file server computer system.

29. The dynamic content caching and retrieval system of claim 14 wherein the presentation state signature computation routine uses a hashing function to determine the presentation state signature.

30. The dynamic content caching and retrieval system of claim 29 wherein the hashing function is a one-way hashing function.

31. The dynamic content caching and retrieval system of claim 30 wherein the one-way hashing function is one of Snefru, N-Hash, MD5, Secure Hash Algorithm (SHA), RIPE-MD, and HAVAL.

32. The dynamic content caching and retrieval system of claim 14 wherein the computer readable medium further includes state information that at least one subsequent presentation state includes version information of the file displayed by the client computer system.

33. The dynamic content caching and retrieval system of claim 14 further comprising a web server application operable to receive the computer readable representation and to serve the retrieved file to the client computer system.

34. The dynamic content caching and retrieval system of claim 14 wherein the routine comprises a web server application.

35. The dynamic content caching and retrieval system of claim 14 wherein the client computer system is one of a plurality of interconnected client computer systems operating in a distributed computing environment and coupled to a server computer system.

36. The dynamic content caching and retrieval system of claim 35 wherein the plurality of interconnected client computer systems and the server computer system are coupled via a network.

37. The dynamic content caching and retrieval system of claim 36 wherein the network is the Internet and each of the files are web pages.

38. The dynamic content caching and retrieval system of claim 14 wherein the one or more parameters selected by a user include configuration options selections for one or more configurable products for display in accordance with the associated dynamically generated electronic file.

39. The dynamic content caching and retrieval system of claim 14 wherein the one or more parameters selected by a user interacting with a file displayed by the client computer system include configuration options selections for one or more configurable products for display in accordance with the dynamically generated electronic file.

40. A dynamic content caching and retrieval system that facilitates reusability of cached dynamically generated electronic files, the system comprising:
- means for caching the dynamically generated electronic files and associating a respective file identifier with each of the dynamically generated electronic files, wherein each file identifier is derived from state information that describes contents of the associated dynamically generated electronic file;
- means for receiving a file request that includes information based on selections of a user interacting with a web page using at least one client computer system (at least col. 5, lines 55–60);
- means for determining whether the file request identifies one of the cached dynamically generated electronic files (at least col. 5, lines 55–60);
- means for retrieving the dynamically generated electronic file identified by the file request and transmitting the file to the at least one client computer system if the file exists in a cache (at least col. 5, lines 55–60);
- means for computing presentation information based on the state information in the file request when a dynamically generated file does not exist in the cache; and
- means for saving the computed presentation information in a file in the cache, thus creating a dynamically generated file, and transmitting the dynamically generated file to the at least one client computer system.

* * * * *